Patented Aug. 28, 1951

2,566,205

UNITED STATES PATENT OFFICE 2,566,205

POLYVINYL HALIDE COMPOSITIONS

James V. Hunn, Avon Lake, Ohio, assignor to The Sherwin-Williams Company, Cleveland, Ohio, a corporation of Ohio No Drawing. Original application January 18, 1945, Serial No. 573,461. Divided and this application November 15, 1947, Serial No. 786,314

8 Claims. (Cl. 260—8)

1

This invention relates to polyvinyl halide compositions, and more particularly, to new and improved plasticized polyvinyl halide compositions.

The present application is a division of copending application Serial No. 573,461, filed January 18, 1945, now abandoned.

The term "a polymerized vinyl halide" refers to polymeric compositions that are wholly or primarily a polyvinyl halide. This includes compositions consisting substantially of a vinyl chloride polymer and compositions in which vinyl acetate or vinylidene chloride has been copolymerized with vinyl chloride in the manufacture of the polymer.

It is well known to those skilled in the art that polyvinyl halides are very difficult to plasticize because many plasticizers which are suitable for plasticizing other types of materials, such as cellulose acetate, nitrocellulose and ethyl cellulose, are unsuitable for plasticizing polyvinyl halide polymers. It is not possible to predict that a plasticizer for a cellulose derivative such as cellulose acetate will also be a suitable plasticizer for polyvinyl halide polymers. A great many good plasticizers for cellulose derivatives are poor plasticizers for polyvinyl halides.

Both the chemical structure and the molecular weight of a given plasticizer appear to influence its relative compatibility with cellulose derivatives and polyvinyl halides. Thus, the monobenzoyl benzoic acid esters of glycerine and ethylene glycol which contain free hydroxyl groups are not suitable plasticizers for polyvinyl halide polymers.

The incompatibility of the plasticizer with the polyvinyl halide polymer causes the plasticizer to sweat out of the surface of polyvinyl halide films and molded objects. Since substances which are suitable as plasticizers for polyvinyl halide films are usually solvents for varnish and lacquer, the polyvinyl halide products containing them may damage varnished and lacquered surfaces where this incompatibility and consequent sweating occurs. Another disadvantage of some plasticizers is that the heating of a composition containing the plasticizer may cause loss of the plasticizer and thereby produce an unstable polyvinyl halide composition.

One of the objects of the present invention is to provide polyvinyl halide compositions plasticized with plasticizing agents which are compatible with the polyvinyl halide but which at the same time are characterized by a very low vapor pressure at ordinary or room temperatures, whereby only small amounts of the plasticizer are lost upon aging of a film containing it.

2

Another object of the invention is to prepare polyvinyl halide compositions containing plasticizers which do not sweat out to the surface of polyvinyl halide films and molded objects formed from the compositions.

Another object of the invention is to provide new and useful plasticized polyvinyl halide compositions from readily available raw materials.

Still a further object of the invention is to prepare new and useful polyvinyl chloride emulsions containing plasticizers and characterized by the ability to deposit clear films from the emulsion system upon air drying. Other objects will appear hereinafter.

In accordance with the invention, it has been found that new and improved results are obtained in plasticizing polymerized vinyl halide polymers with esters in which the carboxylic acid radical of an o-benzoyl benzoic acid is esterified either by a polyhydric alcohol or by an alcohol ether in such a way that the resultant compound contains no free hydroxy groups. Where the plasticizer is made from a polyhydric alcohol it is essential for the purpose of the invention that all of the hydroxyl groups of the polyhydric alcohol be esterified with an o-benzoyl benzoic acid because it has been found that while compounds containing free hydroxyl groups are good plasticizers for cellulose derivatives, they are not suitable plasticizers for polyvinyl halides. Hence, for the purpose of the invention the plasticizers derived from polyhydric alcohols must be poly-esters containing at least two o-benzoyl benzoic acid groups and no hydroxyl groups. These plasticizers are, therefore, relatively high molecular weight compounds and the polyvinyl halide compositions containing them are very stable against loss of the plasticizer due to heating. It was not predictable that such high molecular weight compounds would be suitable plasticizers for polyvinyl halide compositions because, in general, increasing the molecular weight of a plasticizer results in decreased compatibility of the plasticizer with a polyvinyl halide polymer. As will be understood, however, chemical structure, as well as molecular weight, are important factors in determining the suitability of a plasticizer for plasticizing a particular type of composition. Thus, if one of the benzoyl benzoic acid groups in such a poly-ester is substituted by an alkyl radical of the same molecular weight the compatibility of the resultant material as a plasticizer for polyvinyl halide compositions is greatly decreased. This shows that chemical structure is a more important factor than molecular weight in determining the suitability of a plasticizer for a particular purpose. The mono-esters formed by the esterification of o-benzoyl benzoic acid with an alcohol ether, although effective for the purpose of the invention, are not as good as the poly-esters containing two or more o-benzoyl benzoic acid nuclei.

The invention will be further illustrated but is not limited by the following examples, in which the quantities are stated in parts by weight unless otherwise indicated.

EXAMPLE I

A solution was prepared by mixing together 750 parts of methyl ethyl ketone, 250 parts of toluene, heating to boiling, and adding 40 parts of a polyvinyl chloride polymer (Vinylite QYNA). The mixture was stirred and heated until solution was effected, during which a part of the solvent was evaporated. Additional solvent was added until the total solution weight was 1000 parts.

One part of triethylene glycol di(o-(p-toluyl) benzoate) was mixed with 25 parts of the aforementioned polyvinyl chloride solution until solution was effected, and the resultant solution was then poured into a clean surface, viz., a tin vessel, in order to produce a layer about $\frac{1}{16}$" to $\frac{1}{8}$" thick. The resultant layer was then heated to 200 degrees F. for about 20 to 30 minutes, and the condition of the film was noted after cooling. The film was not cloudy, had not receded from the edge of the vessel, and did not show any evidence of "sweating out" even after standing a few days. It was pliable but not sticky. Also, it was completely colorless and continued to remain so while retaining all of its original pliability.

EXAMPLE II

The plasticizing properties of esters prepared in accordance with the invention were also demonstrated by incorporating the esters with solid vinyl chloride polymers. This was done by adding 150 parts of polyvinyl chloride (Vinylite QYNA) in a Banbury mill and starting the rollers. Equal parts by weight (150 parts) of triethylene glycol di(o-(p-toluyl) benzoate) were gradually added and the contents held in the mill with pressure on the top. Steam heat under pressure was applied until a thoroughly mixed batch was obtained. The material was then cooled and stripped from the mill. The plasticizer was found to be compatible.

EXAMPLE III

A polyvinyl chloride emulsion was prepared by preparing:

A—3.8 parts of a casein emulsion in 23.6 parts of water;

B—13.4 parts triethylene glycol di(o-(p-toluyl) benzoate) in 9.4 parts dehydrated pine oil;

C—49.8 parts of a commercial polyvinyl chloride emulsion containing 50.4% solids.

A was put into a mixing pump and B added intermittently. The resultant mixture was then mixed with a spatula into 49.8 parts of C. The final emulsion contained 39.2% solids. This product when baked or air dried gave a perfectly clear film of good chemical stability and toughness.

In a similar manner the invention may be practiced with the following plasticizers:

Table A

| | Ester | Characteristics |
|---|---|---|
| (a) | Diethylene glycol di(o-(p-toluyl) benzoate) (From diethylene glycol and o-(p-toluyl) benzoic acid) | Semi-Solid. |
| (b) | Dipropylene glycol di(o-(p-toluyl) benzoate) (From dipropylene glycol and o-(p-toluyl) benzoic acid) | Do. |
| (c) | Glyceryl tri-(o-(p-toluyl) benzoate) (From glycerine and o-(p-toluyl) benzoic acid) | Solid. |
| (d) | Glyceryl tri(o-benzoyl benzoate) (From glycerine and o-benzoyl benzoic acid) | Do. |
| (e) | Glycol di(o-(p-toluyl) benzoate) (From ethylene glycol and o-(p-toluyl) benzoic acid) | Do. |
| (f) | Ethyl carbitol o-benzoyl benzoate (From ethyl carbitol and o-benzoyl benzoic acid) | Liquid. |
| (g) | Butyl cellosolve o-benzoyl benzoate (From butyl cellosolve and o-benzoyl benzoic acid) | Do. |
| (h) | Nonaethylene glycol di(o-(p-toluyl) benzoate) (From nonaethylene glycol and o-(p-toluyl) benzoic acid) | Do.[1] |
| (i) | Triethylene glycol di(o-benzoyl benzoate) (From triethylene glycol and o-benzoyl benzoic acid) | Semi-Solid. |
| (j) | Butyl cellosolve o-(p-toluyl) benzoate (From ethylene glycol mono-butyl ether and o-(p-toluyl) benzoic acid) | Liquid. |
| (k) | Butyl carbitol o-(p-toluyl) benzoate (From diethylene glycol mono-butyl ether and o-(p-toluyl) benzoic acid) | Do. |
| (l) | Ethyl carbitol o-(p-toluyl) benzoate (From diethylene glycol mono-ethyl ether and o-(p-toluyl) benzoic acid) | Semi-Solid. |

[1] Vis. $Z_6$ (Gardner-Holdt), specific gravity 1.09.

The expression "an o-benzoyl benzoic acid" is used herein to describe generically o-benoyl benzoic acid, o-(p-toluyl) benzoic acid and related compounds.

The o-benzoyl benzoic acid portion of the ester molecule may have one or more of the hydrogen atoms in one or both of the benzene nuclei replaced by substituent atoms or groups which are substantially inert under the esterification conditions, e. g. alkyl (methyl, ethyl, propyl, and higher homologous radicals), and alkoxy (methoxy, ethoxy, butoxy, etc.).

The polyhydric alcohols and alcohol ethers esterified with the o-benzoyl benzoic acid (or substituted o-benzoyl benzoic acid) for the purpose of the invention include ethylene, propylene and butylene glycols; di-, tri-, tetra-, penta-, hexa-, hepta-, octa-, and nona-ethylene glycols; di-, tri-, and tetrapropylene glycols; mixed ethylene-propylene glycols; methyl, ethyl and butyl ethers of diethylene glycol; methyl, ethyl, butyl, benzyl and phenyl ethers of ethylene glycol; glycerine; and homologues thereof.

In preparing plasticizers for the purpose of the invention, it is preferable to esterify an o-benzoyl benzoic acid in either one of two ways, namely, (1) without a solvent or (2) in the presence of a solvent. The non-solvent method (method No. 1) is preferably employed where the esterifying agent is ethylene glycol or other low boiling water soluble alcohol or alcohol ether. The solvent method is preferably used with the higher boiling types of esterifying agents, such as, for example, triethylene glycol. Any organic solvent which is inert to the reacting materials, and which is a solvent for one or both of the reacting materials, may be used although especially good results have been obtained with toluene.

The usual esterification catalysts may be used but are not necessary. In general, the presence of a catalyst causes discoloration and necessitates washing. In most cases, at temperatures around 380 degrees F. to 400 degrees F., the esterification reaction proceeds rapidly and substantially to completion in the absence of a catalyst. Higher temperatures usually cause discoloration and lower temperatures decrease the esterification rate. The addition of toluene or other water removing solvents at intervals during the reaction serves to control the temperature and to maintain a rapid reflux rate.

In general, the plasticizers derived from glycols and glycerine are solid, semi-solid, or liquid, whereas those derived from alkyl ethers of alkylene glycols and other ether-alcohols are liquids. They are very high boiling compounds, insoluble in water, and have specific gravities of approximately 1.1. They are also characterized by low vapor pressures at room temperatures (e. g., 75 degrees F.).

The quantity of ester of the type herein described required to plasticize a polymerized vinyl halide may vary rather widely depending upon the specific substances and the result desired. For example, a small amount, say 1-2% of ester, might be added to increase the toughness of the polymeric compound. Larger amounts, preferably 5% and upwards by weight of the ester can be used up to the limit of compatibility, i. e., the point where the product is no longer tack-free and sweating out occurs. With polyvinyl chloride, good results are still obtained even with as much as 60% of ester, based upon the total weight of the composition.

Those plasticizers are especially adaptable to polyvinyl chloride resins and other related plastics such as vinylidene chloride polymers of the Saran F type. Polyvinyl chloride films plasticized with these compounds have excellent toughness and strength. With certain other plasticizers it is possible to deposit clear films by baking under the influence of heat, but air dried films with the same plasticizers are not clear and continuous. With the esters of this invention, however, it is possible to deposit emulsions which will air dry to clear continuous films. This opens up a new field for such polymers, since their use has been retarded by the high cost of solvents for vinyl chloride polymers and by the low concentration of film-forming material that can be dissolved. Hence, plasticizers making it possible to lay clear air dried films are an important contribution to the coating industry.

Coating compositions prepared in accordance with the invention and containing plasticizers of the type described herein may also contain other customary ingredients such as pigments, dispersing agents and other auxiliary materials added for a specific purpose.

Having thus described the invention, what I claim as new and desire to secure by Letters Patent of the United States is:

1. A composition of matter comprising a polymerized vinyl halide and a plasticizer which is an ester of an o-benzoyl benzoic acid having the carboxylic acid radical of the o-benzoyl benzoic acid esterified by an amount of an organic hydroxy compound selected from the class consisting of glycerol, alkylene glycols and ethers of said glycols sufficient to esterify said acid without leaving unreacted hydroxyl groups.

2. A film-forming composition comprising as the primary film-forming material a polymerized vinyl chloride, and containing plasticizing amounts of an ester in which the carboxylic acid radical of an o-benzoyl benzoic acid is esterified by an amount of an organic hydroxy compound selected from the class consisting of glycerol, alkylene glycols and ethers of said glycols sufficient to esterify said acid without leaving unreacted hydroxyl groups.

3. A film-forming composition comprising a polymerized vinyl chloride as the primary film-forming material, and containing plasticizing amounts of a di-ester of an alkylene glycol in which the two hydroxyl groups are esterified with an o-benzoyl benzoic acid.

4. A film-forming composition comprising a polymerized vinyl chloride and plasticizing amounts of triethylene glycol di(o-(p-toluyl) benzoate).

5. A polymerized vinyl chloride oil and water emulsion containing as a plasticizer a quantity of a di-ester of an alkylene glycol in which the two hydroxyl groups of the alkylene glycol are esterified with an o-benzoyl benzoic acid, said emulsion forming clear air dried films when applied as a coating composition.

6. A composition of matter comprising a polymer made from a monomeric material consisting essentially of vinyl chloride and as a plasticizer therefor the o-(p-toluyl) benzoic acid ester of diethylene glycol monobutyl ether.

7. A film-forming composition comprising an emulsion consisting essentially of a casein in water and oil emulsion and a polymerized vinyl chloride in water emulsion containing an ester of an o-benzoyl benzoic acid having the carboxylic acid radical of the o-benzoyl benzoic acid esterified by an amount of an organic hydroxy compound from the class consisting of glycerol, alkylene glycols and ethers of said glycols sufficient to esterify said acid without leaving unreacted hydroxyl groups.

8. A film-forming composition comprising an emulsion consisting essentially of a casein in water and oil emulsion and a polymerized vinyl chloride in water emulsion containing triethylene glycol di-(o(p-toluyl) benzoate).

JAMES V. HUNN.

REFERENCES CITED

The following references are of record in the file of this patent:

UNITED STATES PATENTS

| Number | Name | Date |
| --- | --- | --- |
| 2,036,271 | Hahn | Apr. 7, 1936 |
| 2,372,947 | Gresham | Apr. 3, 1945 |